US012214796B2

(12) United States Patent
Sakurai et al.

(10) Patent No.: US 12,214,796 B2
(45) Date of Patent: Feb. 4, 2025

(54) SIMULATION APPARATUS AND PROCESSING LOAD ADJUSTMENT DEVICE

(71) Applicant: Mitsubishi Electric Corporation, Tokyo (JP)

(72) Inventors: Kenta Sakurai, Tokyo (JP); Norio Ikeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 233 days.

(21) Appl. No.: 17/789,801

(22) PCT Filed: Mar. 9, 2020

(86) PCT No.: PCT/JP2020/009995
§ 371 (c)(1),
(2) Date: Jun. 29, 2022

(87) PCT Pub. No.: WO2021/181456
PCT Pub. Date: Sep. 16, 2021

(65) Prior Publication Data
US 2023/0043713 A1    Feb. 9, 2023

(51) Int. Cl.
*B60W 50/14*    (2020.01)
*B60W 40/02*    (2006.01)

(52) U.S. Cl.
CPC ............ *B60W 50/14* (2013.01); *B60W 40/02* (2013.01); *B60W 2050/146* (2013.01)

(58) Field of Classification Search
CPC ....... B60W 50/14; B60W 40/09; B60R 21/00; G11C 7/1045; G01C 21/3469
See application file for complete search history.

(56) References Cited

U.S. PATENT DOCUMENTS

| 6,028,816 A | * | 2/2000 | Takemae | G11C 7/1045 |
| | | | | 365/194 |
| 2016/0123752 A1 | * | 5/2016 | Kandula | G01C 21/3469 |
| | | | | 701/123 |
| 2020/0005399 A1 | * | 1/2020 | Takamatsu | B60W 40/09 |

FOREIGN PATENT DOCUMENTS

| JP | 2013-130928 A | | 7/2013 | |
| WO | WO-2018142853 A1 | * | 8/2018 | ............. B60R 21/00 |

OTHER PUBLICATIONS

International Search Report and Written Opinion mailed on Jun. 2, 2020, received for PCT Application PCT/JP2020/009995, filed on Mar. 9, 2020, 8 pages including English Translation.

* cited by examiner

Primary Examiner — Yuri Kan
(74) Attorney, Agent, or Firm — XSENSUS LLP

(57) ABSTRACT

In a simulation apparatus for a cockpit system of a vehicle, a driving environment simulation unit performs simulation of a driving environment of the vehicle involving a driving behavior to acquire driving behavior data and generate a travel image as an image simulating scenery visible from the vehicle during travelling. A travel image display unit displays the travel image. A component display unit displays an image of a component generated based on the driving behavior data. A processing load calculation unit calculates a processing load of the simulation apparatus based on at least one of a time difference between acquisition of the driving behavior data and display of the image of the component corresponding to the driving behavior data and a time difference between acquisition of the driving behavior data and display of the travel image generated in response to the driving behavior data.

9 Claims, 11 Drawing Sheets

F I G. 5
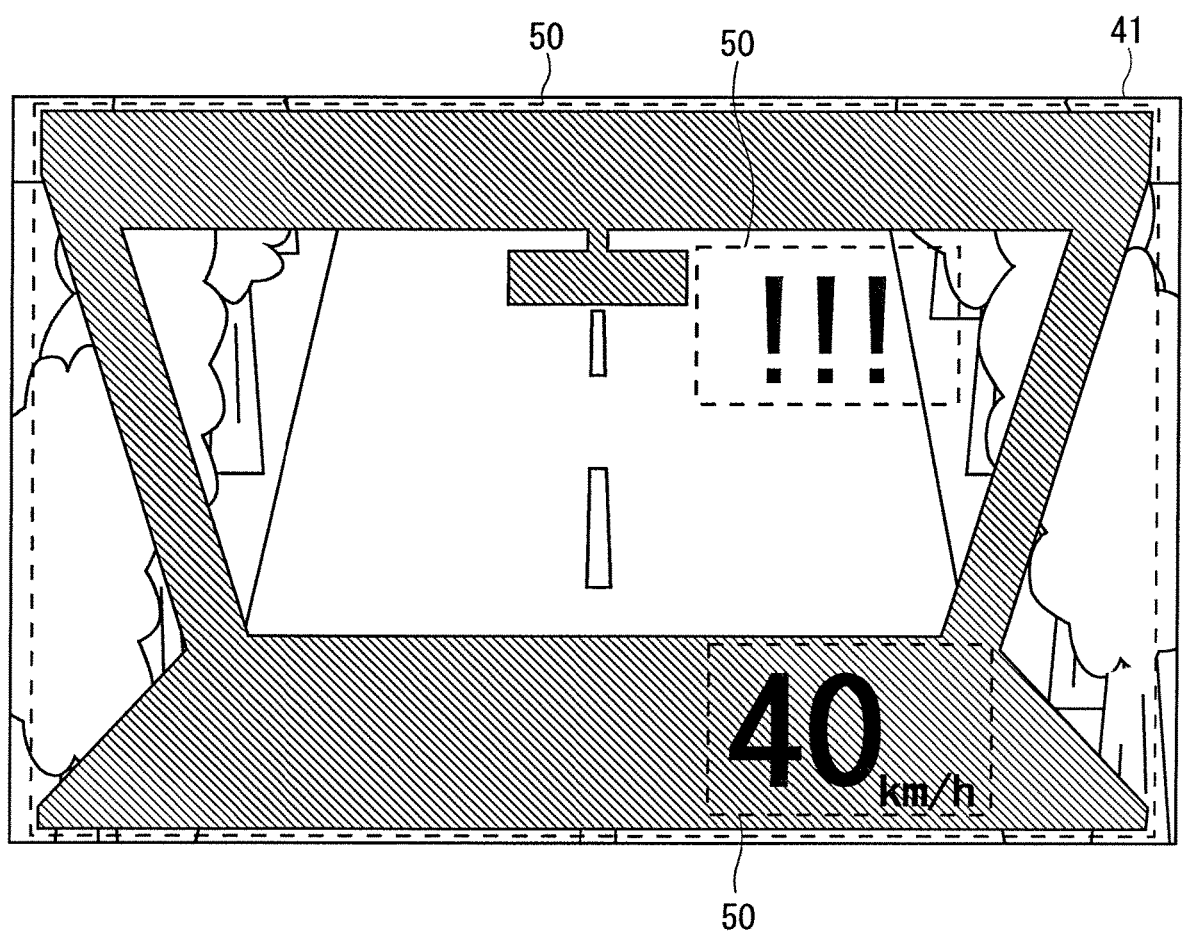

F I G. 6
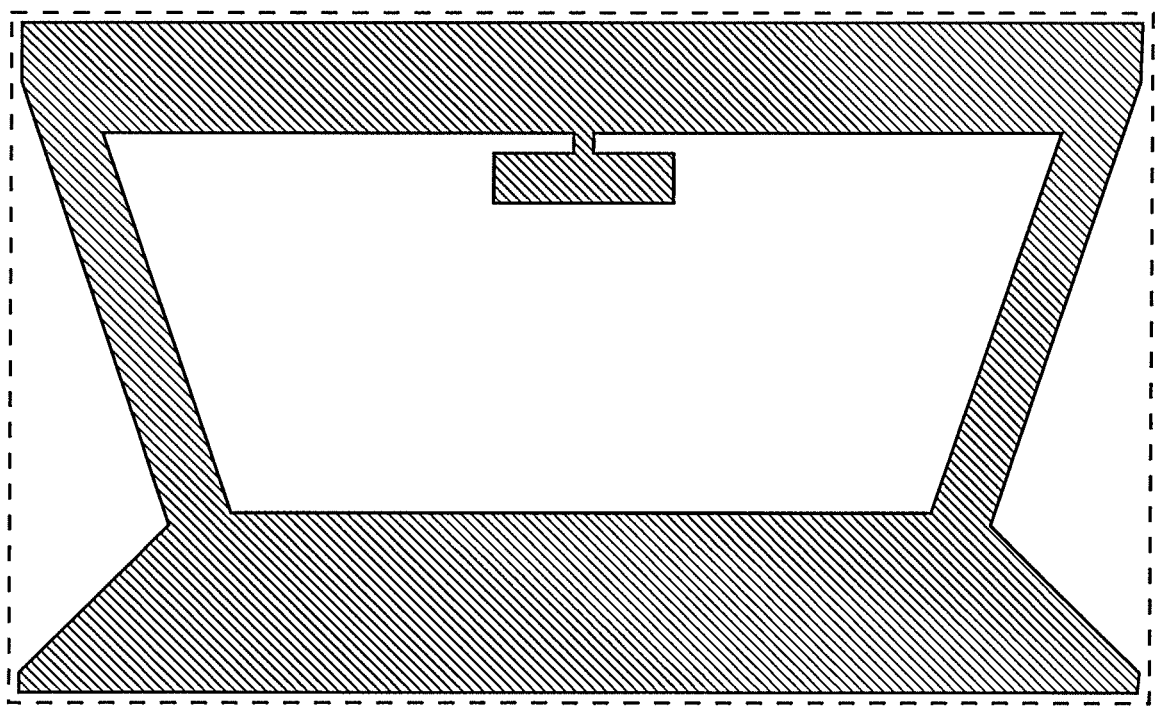

F I G. 1 0
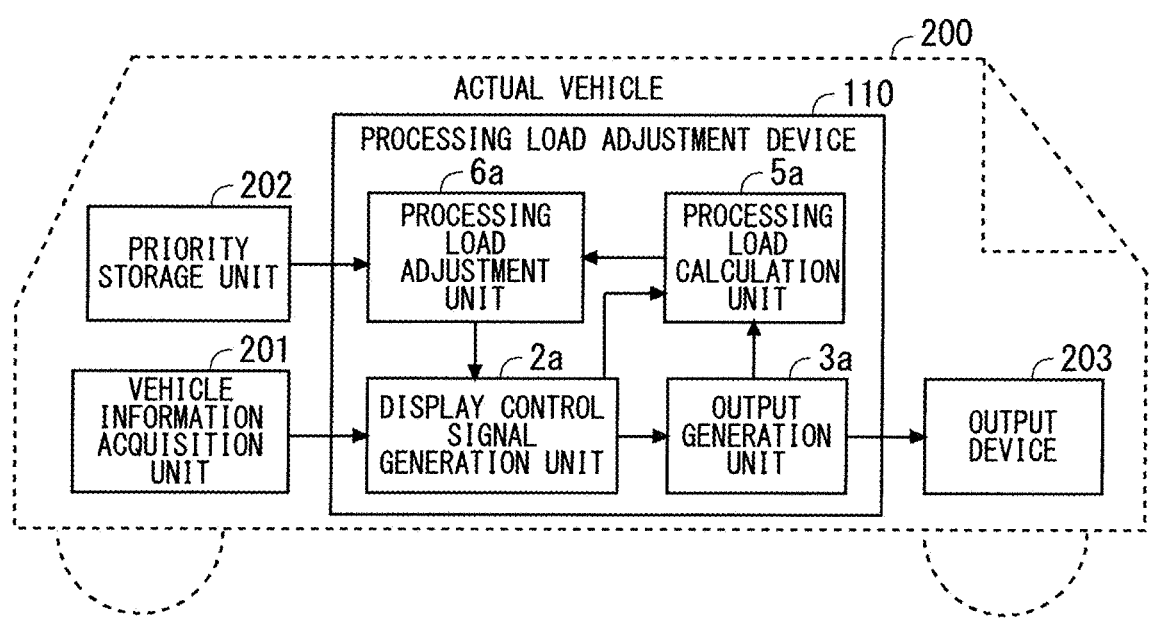

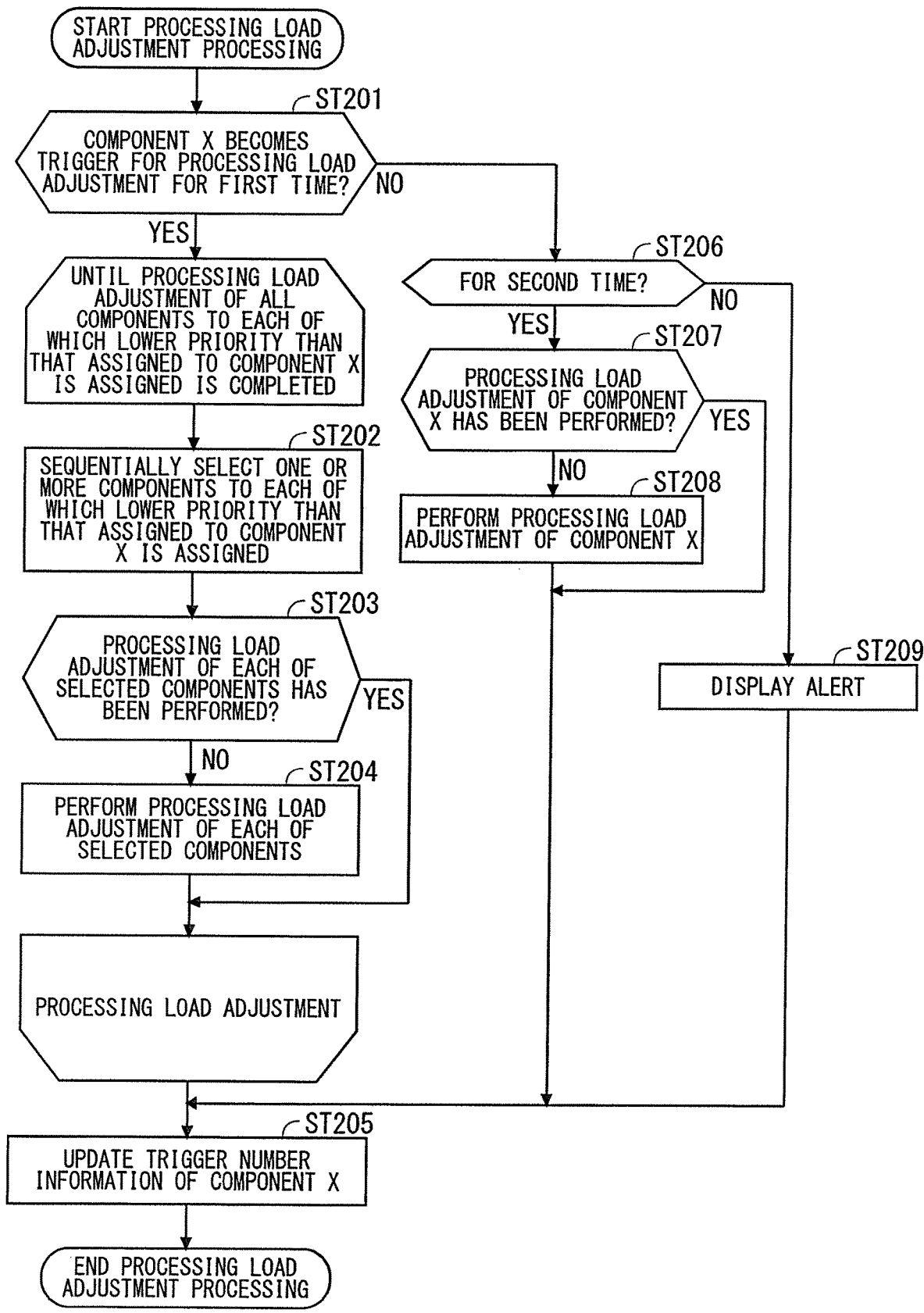

SIMULATION APPARATUS AND PROCESSING LOAD ADJUSTMENT DEVICE

CROSS-REFERENCE TO RELATED APPLICATION

The present application is based on PCT filing PCT/JP2020/009995, filed Mar. 9, 2020, the entire contents of which are incorporated herein by reference.

TECHNICAL FIELD

The present disclosure relates to a simulation apparatus to evaluate a cockpit system of a vehicle, and to a processing load adjustment device to adjust a processing load of the cockpit system.

BACKGROUND ART

The amount of information presented to a driver and the number of means of presenting information continue to increase in a cockpit system of a vehicle. It is necessary to verify and evaluate whether the amount of information presented to the driver and the means of presenting information are appropriate in design and development of the cockpit system.

Prototyping of the cockpit system for evaluation, however, is time- and cost-intensive, and a significant loss occurs when reworking is required as a result of evaluation. It is therefore desirable to develop a simulation apparatus that can simulate operation of the cockpit system while simulating a driving condition of the driver.

For example, Patent Document 1 below discloses a design support device for a cockpit system that generates a simulation image simulating a cockpit of a vehicle including a plurality of displays based on model data modeling the cockpit, a display parameter relating to the model data, and a display image simulating images displayed by the plurality of displays. The design support device regenerates the simulation image in response to an update to the display image, and thus can evaluate the cockpit including the plurality of displays based on an actual driving condition of a driver.

PRIOR ART DOCUMENT

Patent Document

Patent Document 1: Japanese Patent Application Laid-Open No. 2013-130928

SUMMARY

Problem to be Solved by the Invention

In simulating a driving condition of a driver, evaluation that takes into account action and a psychological condition of the driver during a driving behavior can be performed only during the driving behavior. Simulation of the cockpit system involving the driving behavior of the driver, however, increases a processing load of simulation, and image generation processing cannot be performed in real time. An image to be displayed with the driving behavior is thus delayed from the driving behavior, and valid evaluation of the cockpit system cannot be performed. In an actual cockpit system, the increase in processing load makes it difficult to perform the image generation processing in real time, leading to abnormal display. A system that can evaluate the processing load of the cockpit system or the simulation apparatus therefor is thus desirable.

The present disclosure has been conceived to solve a problem as described above, and it is an object of the present disclosure to enable evaluation of a processing load of a cockpit system or a simulation apparatus therefor.

Means to Solve the Problem

A simulation apparatus according to the present disclosure is a simulation apparatus for a cockpit system of a vehicle, and includes: a driving environment simulation unit to perform simulation of a driving environment of the vehicle involving a driving behavior to acquire driving behavior data as data relating to the driving behavior and generate a travel image as an image simulating scenery visible from the vehicle during travelling; a display control signal generation unit to generate a control signal to control display of a component of the cockpit system based on the driving behavior data; an output generation unit to generate an image of the component based on the control signal; a travel image display unit to display the travel image; a component display unit to display the image of the component; a processing load calculation unit to calculate a processing load based on at least one of a time difference between acquisition of the driving behavior data and display of the image of the component corresponding to the driving behavior data and a time difference between acquisition of the driving behavior data and display of the travel image generated in response to the driving behavior data; and a processing load adjustment unit to adjust the processing load.

A processing load adjustment device according to the present disclosure is a processing load adjustment device for a cockpit system of an actual vehicle, and includes: a display control signal generation unit to generate a control signal to control display of a component of the cockpit system based on vehicle information of the actual vehicle; an output generation unit to generate an image of the component based on the control signal, and cause the cockpit system to display the image of the component; a processing load calculation unit to calculate a processing load based on a time difference between acquisition of the vehicle information and display of the image of the component corresponding to the vehicle information; and a processing load adjustment unit to adjust the processing load.

Effects of the Invention

According to the present disclosure, the time difference between acquisition of the data to generate the image of the component of the cockpit system and display of the image of the component corresponding to the data or the time difference between acquisition of the driving behavior data and display of the travel image generated in response to the driving behavior data is calculated, and the processing load can be evaluated based on the time differences.

The objects, features, aspects, and advantages of the present disclosure will become more apparent from the following detailed description and the accompanying drawings.

BRIEF DESCRIPTION OF DRAWINGS

FIG. 5 shows an example of a transmissive window superimposed on a travel image display unit according to Embodiment 3.

FIG. 6 shows an example of an image of a component of a cockpit system.

FIG. 10 shows an example of a configuration of a processing load adjustment device according to Embodiment 4.

FIG. 11 is a flowchart showing operation of a processing load adjustment unit of the processing load adjustment device according to Embodiment 4.

DESCRIPTION OF EMBODIMENTS

Embodiment 1

Figure 1:
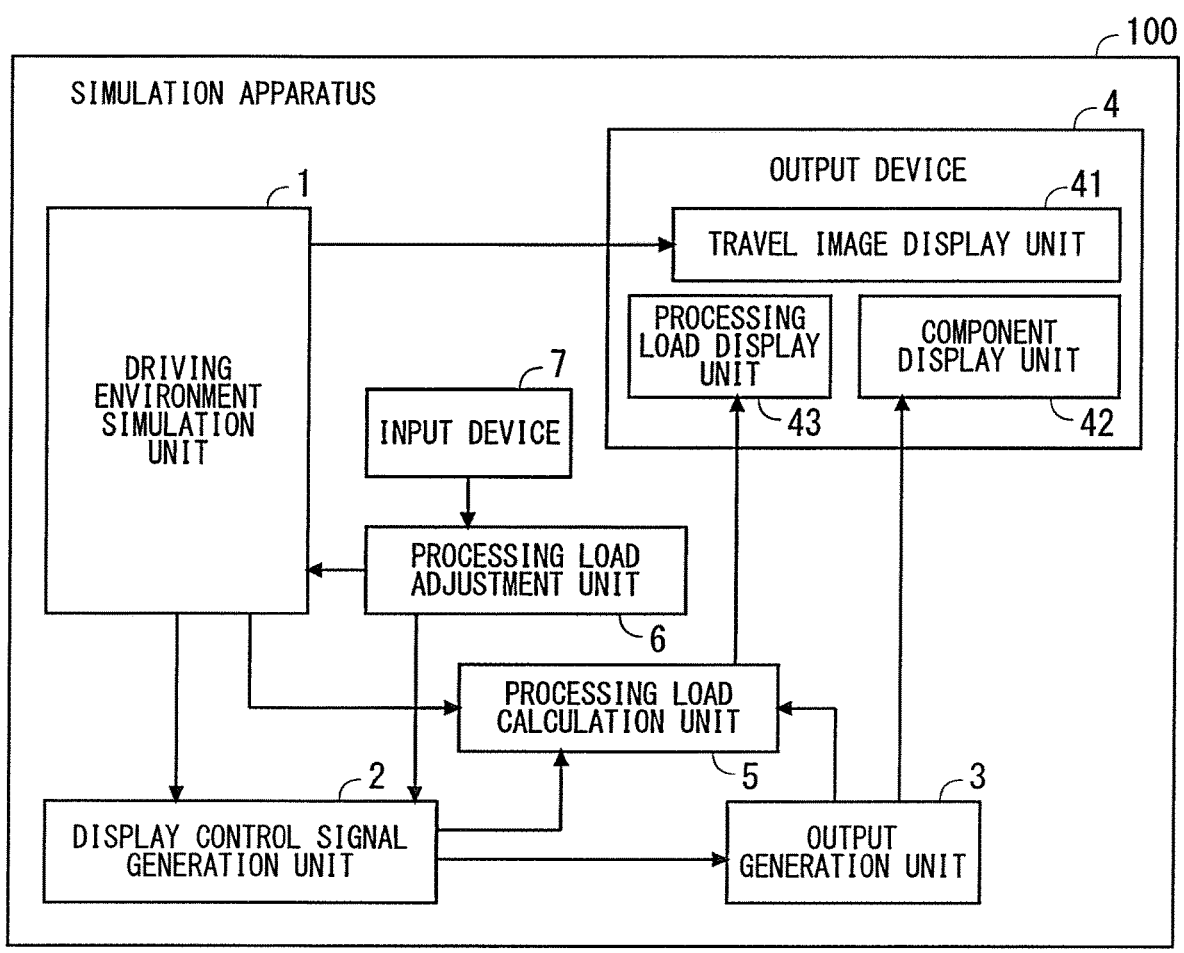
FIG. 1 shows an example of a configuration of a simulation apparatus according to Embodiment 1.

FIG. 1 shows an example of a configuration of a simulation apparatus 100 according to Embodiment 1. The simulation apparatus 100 simulates operation of a cockpit system of a vehicle. A user of the simulation apparatus 100 is an evaluator evaluating the cockpit system based on a result of simulation.

As shown in FIG. 1, the simulation apparatus 100 includes a driving environment simulation unit 1, a display control signal generation unit 2, an output generation unit 3, an output device 4, a processing load calculation unit 5, a processing load adjustment unit 6, and an input device 7. From among these components, the driving environment simulation unit 1, the display control signal generation unit 2, the output generation unit 3, the processing load calculation unit 5, and the processing load adjustment unit 6 are applications performed by single or multiple computers (processors) and created in any programming language.

Figure 2:
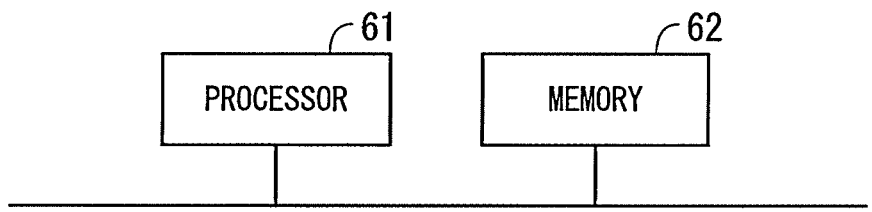
FIG. 2 shows an example of a hardware configuration of the simulation apparatus.

The simulation apparatus 100 can thus have a hardware configuration including a processor 61 to perform a program and memory 62 to store an application program which, when performed by the processor 61, results in performance of processing of each of the driving environment simulation unit 1, the display control signal generation unit 2, the output generation unit 3, the processing load calculation unit 5, and the processing load adjustment unit 6 as shown in FIG. 2, for example. Socket communication can be used as a method for establishing communication between applications, for example, but the method is not limited to the socket communication, and may be another method. Data communicated between applications is serialized by a transmitter, and is deserialized by a receiver.

The driving environment simulation unit 1 simulates a driving condition of the vehicle. Simulation performed by the driving environment simulation unit 1 causes a virtual vehicle to travel in response to operation of the evaluator as the user in a virtual space configured by a 3D model. The evaluator inputs operation corresponding to the driving behavior of the vehicle into the driving environment simulation unit 1, so that the driving environment simulation unit 1 can perform simulation involving the driving behavior.

The driving environment simulation unit 1 may be configured by a driving simulator using known technology.

A component of the cockpit system includes a component that can be evaluated in a static condition, such as arrangement of interiors of the vehicle. On the other hand, a component whose operation details and operation timing are determined depending on a dynamic element varying with the driving behavior, such as a location, a speed, an orientation, and an ambient environment of the vehicle and a condition of a driver, can validly be evaluated only in a dynamic condition. For example, in the cockpit system, operation to cause a head up display (HUD) to display an overspeed alert is required to cause the driver to recognize the alert without interfering with the driving behavior of the driver, and is thus required to be evaluated by performing simulation involving the driving behavior. In addition, evaluation of the cockpit system that takes into account action and a psychological condition of the driver during the driving behavior can be performed only by performing simulation involving the driving behavior.

In Embodiment 1, assume that a driving operation device (not shown) for the evaluator to perform operation corresponding to the driving behavior, such as a steering wheel, an accelerator pedal, a brake pedal, and a gearshift, is connected to the driving environment simulation unit 1, and the evaluator can input the driving behavior into the driving environment simulation unit 1 by operating the driving operation device. When the cockpit system is readily evaluated, however, simulation data of the driving operation device may be used in place of an actual driving operation device.

The driving environment simulation unit 1 outputs driving behavior data as data relating to the driving behavior, a travel image as an image simulating scenery visible from the virtual vehicle travelling based on the driving behavior, and time information regardless of whether the evaluator is performing the driving behavior (operation of the driving operation device).

The driving behavior data includes information indicating a travelling condition of the virtual vehicle varying with the driving behavior, such as a speed, a location, and an orientation of the virtual vehicle. The driving behavior data may further include information on an external environment of the virtual vehicle varying with the driving behavior, such as information on another vehicle around the virtual vehicle, information on a structure (e.g., a tunnel and a traffic sign) around the virtual vehicle, and information on a natural environment (e.g., weather) around the virtual vehicle. Details of the driving behavior data are dependent on details of data that the output generation unit 3 requires, and are not limited to those in the above-mentioned example.

The driving environment simulation unit 1 may acquire the time information in any way. A sample period of the driving behavior data can vary among sensors acquiring the driving behavior data. The time information is thus provided for each piece of the driving behavior data. As a result, the time of acquisition of the driving behavior data can be known by reference to the driving behavior data.

The display control signal generation unit 2 acquires the driving behavior data from the driving environment simulation unit 1, and generates a control signal to control display of each component of the cockpit system based on the acquired driving behavior data. Processing that the display control signal generation unit 2 performs on each piece of the driving behavior data is required to be defined in advance. A parameter to adjust a processing load in response to a request for adjustment from the processing load adjustment unit 6 is defined in advance for each operation performed by the display control signal generation unit 2. A remote procedure call (RPC) and the like can be used for the request for adjustment from the processing load adjustment unit 6, for example.

The output generation unit 3 generates an image of each component of the cockpit system based on the control signal generated by the display control signal generation unit 2. The output generation unit 3 may include a plurality of output generation units 3, and, in this case, each of the plurality of output generation units may generate an image of a single component of the cockpit system, or may generate images of two or more components. In a case where images of a plurality of components are displayed on the same screen, for example, the output generation unit 3 performs processing to combine the images of the components.

The output device 4 is a display device including single or multiple screens to display images. The screens of the output device 4 may each be configured by a liquid crystal display or may each be a screen onto which an image is projected by a projector. As shown in FIG. 1, the output device 4 in Embodiment 1 includes a travel image display unit 41 having a screen to display the travel image generated by the driving environment simulation unit 1, a component display unit 42 having a screen to display the image of each component generated by the output generation unit 3, and a processing load display unit 43 having a screen to display the processing load calculated by the processing load calculation unit 5.

The driving environment simulation unit 1 renders the generated travel image on the screen of the travel image display unit 41 of the output device 4. In this case, the driving environment simulation unit 1 notifies the processing load calculation unit 5 of the time of completion of rendering of the travel image. The output generation unit 3 renders the generated image of each component on the screen of the component display unit 42 of the output device 4. In this case, the output generation unit 3 notifies the processing load calculation unit 5 of the time of completion of rendering of the image of each component. The output generation unit 3 may acquire the time information in any way, but preferably acquires the time information in the same way as the driving environment simulation unit 1 to accurately calculate a time difference between acquisition of the driving behavior data and completion of rendering of the image of the component.

The processing load calculation unit 5 compares the time information of the driving behavior data processed by the display control signal generation unit 2 and the time of completion of rendering of the image of the component corresponding to the driving behavior data to calculate a time difference between acquisition of the driving behavior data and display of the image of the component corresponding to the driving behavior data. The processing load calculation unit 5 also compares the time information of the driving behavior data used by the driving environment simulation unit 1 to generate the travel image and the time of completion of rendering of the travel image generated in response to the driving behavior data to calculate a time difference between acquisition of the driving behavior data required to generate the travel image and display of the travel image generated in response to the driving behavior data. The processing load display unit 43 displays these time differences as information on the processing load. The evaluator can determine the validity of simulation of the cockpit system from the information on the time differences (processing load) displayed by the processing load display unit 43. Although the processing load calculation unit 5 herein calculates both the above-mentioned two time differences representing the processing load, the processing load calculation unit 5 is only required to calculate at least one of the time differences.

The screens of the output device 4 are preferably arranged at locations always visible to the evaluator, and, in particular, the screen of the travel image display unit 41 and the screen of the component display unit 42 are preferably arranged side by side or one on top of the other to make it easy for the evaluator to evaluate operation of the cockpit system in response to the driving condition of the vehicle. The location of the screen of the processing load display unit 43 is not limited as long as it is a location visible to the evaluator.

Although an example in which the component of the cockpit system includes only an image is shown in the present embodiment, the component of the cockpit system can include a sound, a vibration, and the like. In this case, the output device 4 is only required to cause the component display unit 42 to display an image representing the occurrence of the sound and the vibration. Alternatively, the output device 4 may include a means of outputting the sound and the vibration (e.g., a speaker and a motor).

The processing load adjustment unit 6 adjusts the processing load of the simulation apparatus 100. A method for adjusting the processing load includes a method of adjusting a period (frequency) of simulation of a driving environment performed by the driving environment simulation unit 1, a method of changing a parameter used for each operation performed by the display control signal generation unit 2, and the like.

The input device 7 is a means for the evaluator to input numerical values, characters, and the like, is configured by a keyboard, for example, and is connected to the processing load adjustment unit 6. The evaluator operates the input device 7 by taking into consideration the information on the processing load displayed by the processing load display unit 43 to input instructions for load adjustment into the processing load adjustment unit 6.

Figure 3:
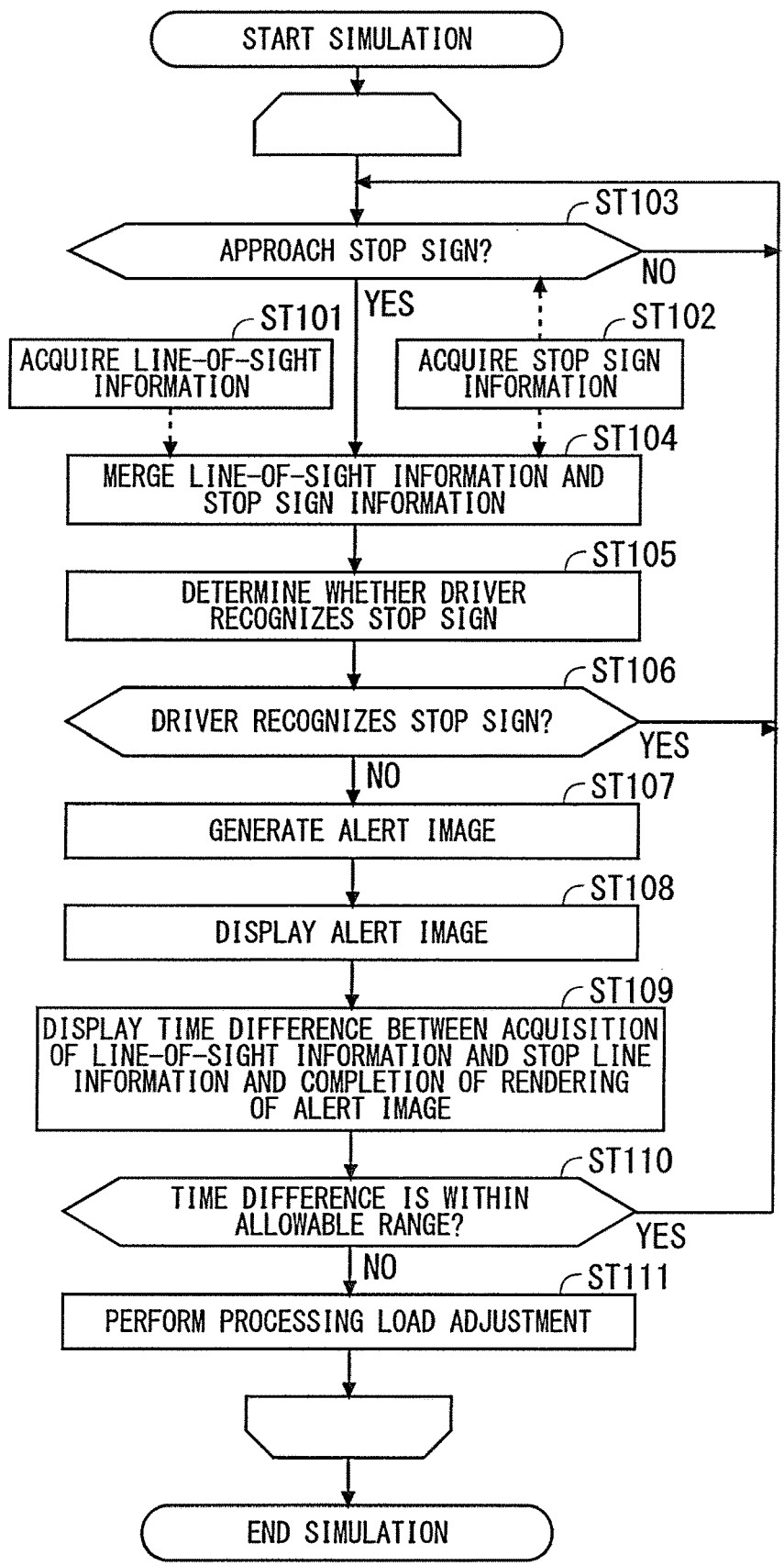
FIG. 3 is a flowchart showing operation of the simulation apparatus according to Embodiment 1.

FIG. 3 is a flowchart showing an example of operation of the simulation apparatus 100. A flow in FIG. 3 indicates operation in a case where operation of the cockpit system of determining whether the driver recognizes a stop sign on the side of a road, and, when determining that the driver does not recognize the stop sign, displaying an alert is evaluated using simulation. Operation of the simulation apparatus 100 will be described below with reference to FIG. 3.

When the simulation apparatus 100 starts simulation of the cockpit system, the driving environment simulation unit 1 starts simulation of the driving condition (simulation to cause the virtual vehicle to travel in the virtual space) based on the driving behavior of the evaluator, and the travel image display unit 41 displays the travel image generated through the simulation.

The driving environment simulation unit 1 starts processing to acquire, as the driving behavior data, line-of-sight information on the line of sight of the evaluator and stop sign information on the stop sign present around the virtual vehicle (steps ST101 and ST102) while proceeding with the simulation of the driving condition. The line-of-sight information is data representing the location of the line of sight of the evaluator by two-dimensional coordinates on the screen of the travel image display unit 41 on which the travel image is displayed. The stop sign information is data including the location and the size of the stop sign in the travel image, the distance from the virtual vehicle to the stop sign, and the like. The location of the stop sign in the travel image can be represented by two-dimensional coordinates of an upper left corner of a square surrounding the stop sign on the screen of the travel image display unit 41, and the size of the stop sign can be represented by the length and the width of the square surrounding the stop sign.

A period of performing step ST101 is dependent on a sensor acquiring the line-of-sight information, a period of performing step ST102 is dependent on a period of simulation of the driving environment, and they are different from a period of simulation of the cockpit system. The time information representing the time of acquisition is provided to each of the line-of-sight information and the stop sign information.

When the virtual vehicle approaches the stop sign (YES in step ST103) in simulation of the driving condition, the driving environment simulation unit 1 merges the acquired stop sign information and the line-of-sight information having the time information closest to the time information of the stop sign information for output (step ST104).

The display control signal generation unit 2 determines whether the line of sight of the evaluator is directed to the stop sign displayed by the travel image display unit 41 based on the stop sign information and the line-of-sight information as merged to determine whether the evaluator recognizes the stop sign.

When it is determined that the evaluator recognizes the stop sign (YES in step ST106), it is not necessary to display the alert, so that processing returns to step ST103, and is held until the virtual vehicle approaches the stop sign again.

On the other hand, when it is determined that the evaluator does not recognize the stop sign (NO in step ST106), the display control signal generation unit 2 generates a control signal to control a component to display the alert, and the output generation unit 3 generates an alert image based on the control signal (step ST107). In step ST107, the processing load calculation unit 5 is notified of the time information of the driving behavior data (the stop sign information and the line-of-sight information) used to determine that the evaluator does not recognize the stop sign as the time of acquisition of the driving behavior data.

The output generation unit 3 displays the generated alert image on the screen of the component display unit 42, and alerts the evaluator to the approach of the stop sign (step ST108). In step ST108, the processing load calculation unit 5 is notified of the time of completion of rendering of the alert image.

The processing load calculation unit 5 calculates a time difference between acquisition of the driving behavior data (the stop sign information and the line-of-sight information) acquired in step ST107 and completion of rendering of the alert image acquired in step ST108, and causes the processing load display unit 43 to display the calculated time difference as the information on the processing load (step ST109).

The evaluator determines whether the time difference displayed by the processing load display unit 43 is within an allowable range (a range within which the cockpit system is validly evaluated) (step ST110). The allowable range of the time difference may vary with an item to be evaluated by simulation. When the time difference is within the allowable range (YES in step ST110), the evaluator is not required to perform any processing, and processing returns to step ST103.

When the time difference exceeds the allowable range (NO in step ST110), the evaluator operates the input device 7 to cause the processing load adjustment unit 6 to adjust the processing load to reduce the time difference (step ST111). One example of processing performed in step ST111 is processing to reduce the resolution of the alert image. In this case, the display control signal generation unit 2 holds the resolution of the alert image as a parameter, and the processing load adjustment unit 6 transmits a request for adjustment including a numerical value of the resolution input by the evaluator to the display control signal generation unit 2 to change the parameter of the resolution of the alert image.

The above-mentioned processing is performed repeatedly, and the evaluator checks the time difference (processing load) displayed by the processing load display unit 43 when the alert image is displayed again after the resolution of the alert image is changed. When the time difference still exceeds the allowable range, the evaluator causes the processing load adjustment unit 6 to adjust the processing load again using the input device 7. In this case, the resolution of the alert image may further be reduced, or another parameter held by the display control signal generation unit 2 may be changed. Alternatively, the period of simulation of the driving environment performed by the driving environment simulation unit 1 may be reduced, or a processing system to perform image processing may be changed.

According to the simulation apparatus 100 according to Embodiment 1, the cockpit system can be evaluated by simulation involving the driving behavior. The evaluator can evaluate the processing load of the simulation apparatus 100 from the time difference between acquisition of the driving behavior data and display of the image of the component corresponding to the driving behavior data or the time difference between acquisition of the driving behavior data and display of the travel image generated in response to the driving behavior data. The evaluator can cause the processing load adjustment unit 6 to adjust the processing load by operating the input device 7 if necessary.

Embodiment 2

Figure 4:
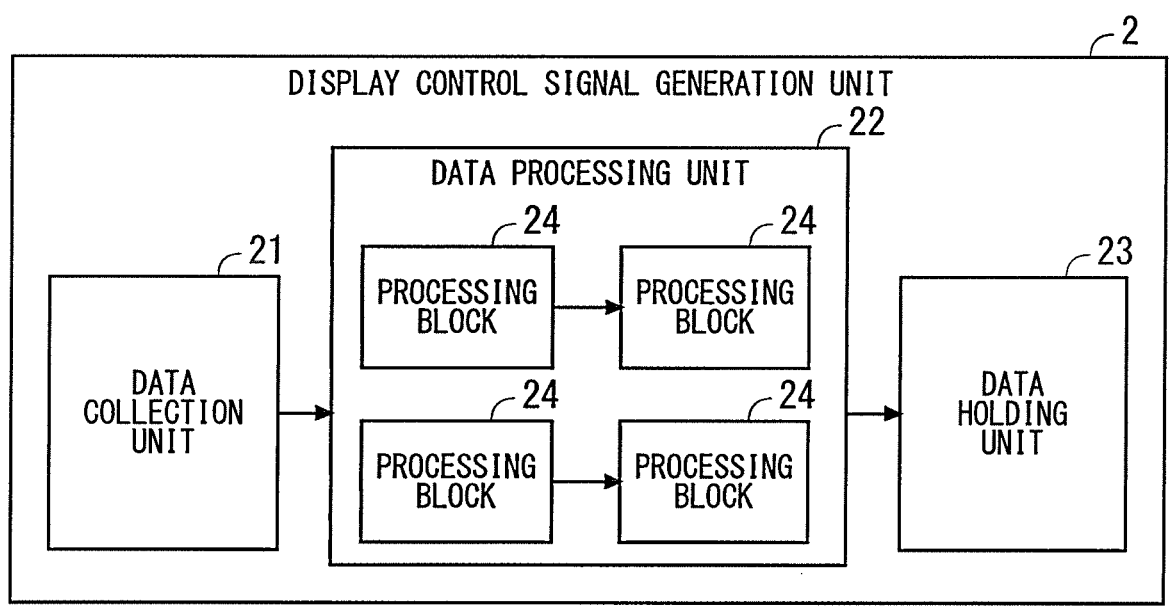
FIG. 4 shows an example of a configuration of a display control signal generation unit of a simulation apparatus according to Embodiment 2.

In Embodiment 2, the display control signal generation unit 2 is subdivided with respect to the simulation apparatus 100 in Embodiment 1. The display control signal generation unit 2 in Embodiment 2 includes a data collection unit 21, a data processing unit 22, a data holding unit 23, and processing blocks 24 as shown in FIG. 4. The simulation apparatus 100 in Embodiment 2 is similar to that in Embodiment 1 except for the configuration of the display control signal generation unit 2, so that only a part relating to the display control signal generation unit 2 will be described below.

The data collection unit 21 collects the driving behavior data output from the driving environment simulation unit 1. Although only one data collection unit 21 is shown in FIG. 4, the data collection unit 21 is provided for each data block of the driving behavior data, and collects the corresponding data block. The data block is a set of data defined in advance between the driving environment simulation unit 1 and the data collection unit 21. For example, in a case where "A" is defined as data having only speed information represented by a scalar value, and "B" is defined as data having speed information represented by a three-dimensional vector represented by x, y, and z, A and B are each a data block. The data block may be defined in any way, for example, by a method of collecting data having a similar sample period of the sensor into the same data block and a method of collecting data having similar processing time into the same data block. However, the driving environment simulation unit 1 serializes and transmits data, and the data collection unit 21 receives and deserializes the data, and thus the data block is required to be defined to be referenced by both the driving environment simulation unit 1 and the data collection unit 21.

The data processing unit 22 performs processing corresponding to data processing performed by the display control signal generation unit 2 described in Embodiment 1. The data processing unit 22 includes the plurality of processing blocks 24, and the data processing is subdivided. Each of the processing blocks 24 holds data block types on an input side and an output side, information on a processing block connected to the input side, and information on a processing block connected to the output side. If there is another processing block 24 having the same data block type as the data block type on the input side or the output side, the other processing block 24 is connectable to the input side or the output side of the processing block 24. A connection relationship between the processing blocks 24 is changed in response to instructions from the processing load adjustment unit 6, and can be changed when the display control signal generation unit 2 is performing the data processing.

The data holding unit 23 acquires and holds the data block processed by the processing block 24 (the data block output from the data collection unit 21 in some cases). The data holding unit 23 is also provided for each data block as with the data collection unit 21. The data block held by the data holding unit 23 is defined to be referenced by both the data holding unit 23 and the output generation unit 3. The data holding unit 23 serves as a data server to hold the data block in a buffer, and transmit the data block in response to a request from the output generation unit 3.

In the display control signal generation unit 2 in Embodiment 2, the processing load adjustment unit 6 can dynamically change the connection relationship between the processing blocks 24 of the data processing unit 22 to process the driving behavior data. When the connection relationship between the processing blocks 24 is changed, processing capability and processing details of the data processing unit 22 can be changed, so that an effect of enriching a processing load adjustment function of the processing load adjustment unit 6 can be obtained.

Embodiment 3

Figure 7:
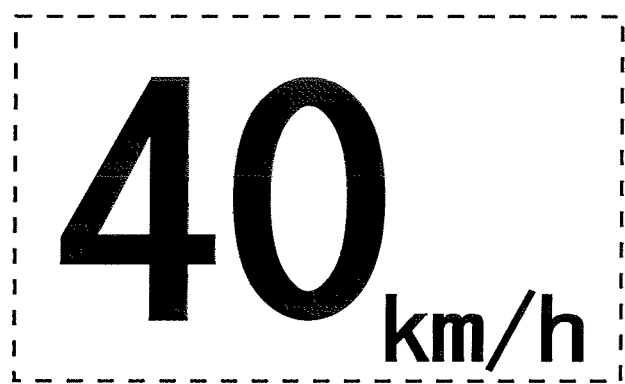
FIG. 7 shows an example of the image of the component of the cockpit system.
Figure 8:
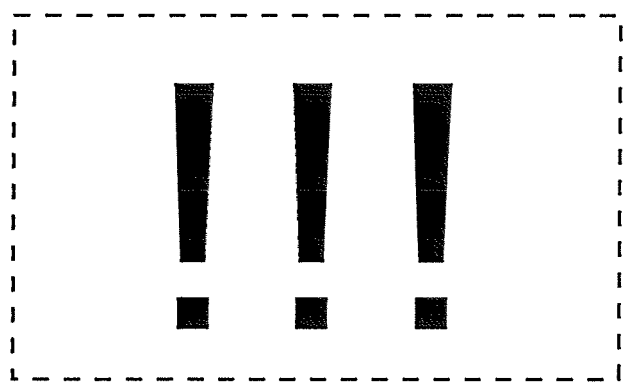
FIG. 8 shows an example of the image of the component of the cockpit system.
Figure 9:
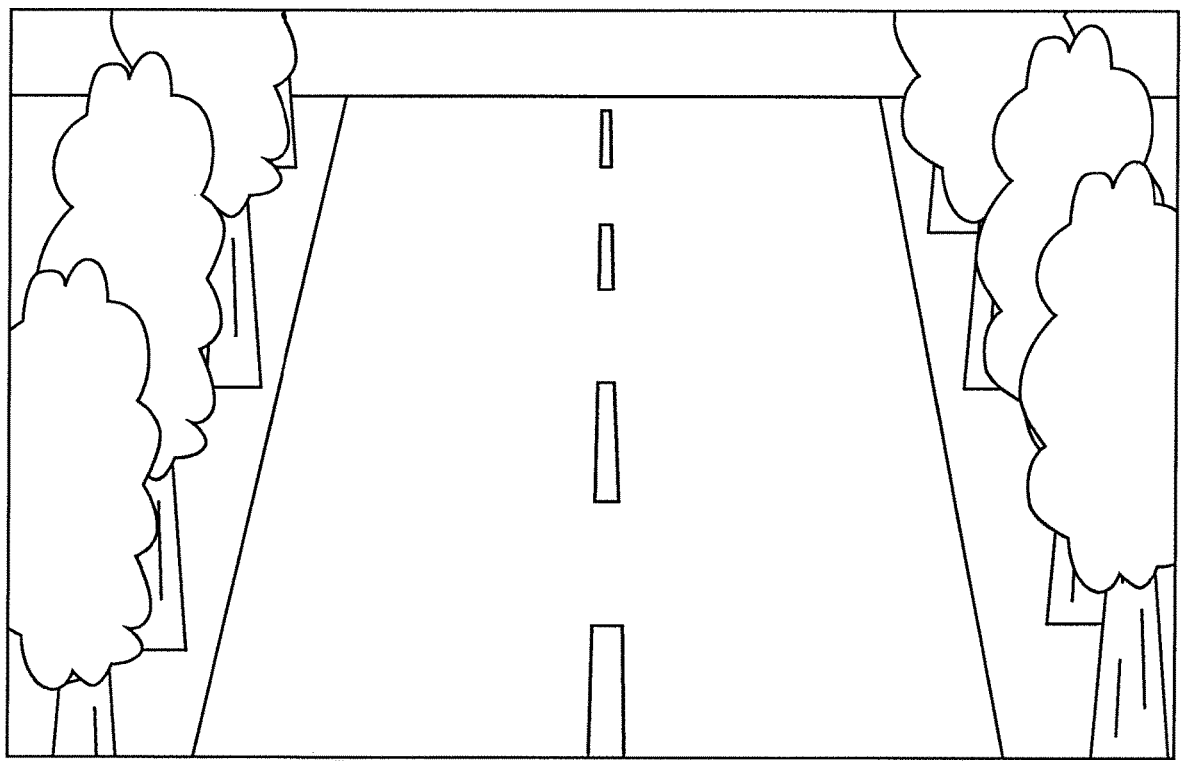
FIG. 9 shows an example of a travel image.

In Embodiment 3, a transmissive window 50 superimposed on the screen of the travel image display unit 41 is included as the screen of the component display unit 42 with respect to the simulation apparatus 100 in Embodiment 1 or 2. FIG. 5 shows examples of the transmissive window 50 superimposed on the travel image display unit 41. FIG. 5 shows an example in which three transmissive windows 50 to display images of components shown in FIGS. 6 to 8 are superimposed on the travel image display unit 41 displaying the travel image shown in FIG. 9. An image of a component shown in FIG. 6 is an image of the contours of a cockpit viewed from within the vehicle, an image of a component shown in FIG. 7 is an image of speed display of the vehicle, and an image of a component shown in FIG. 8 is the alert image. As in this example, the transmissive window 50 is provided for each component of the cockpit system, and a plurality of transmissive windows 50 are sometimes arranged on the screen of the travel image display unit 41.

A portion of the transmissive window 50 in which no image is displayed is transparent, so that the travel image is visible through windows of the cockpit even when the transmissive window 50 displaying the contours of the cockpit is superimposed on the travel image as shown in FIG. 5. A field of view of the driver of the vehicle in the driving condition can thereby be reproduced on the screen of the travel image display unit 41.

In a case where the screen of the component display unit 42 is superimposed on a portion of the screen of the travel image display unit 41, processing to combine images displayed on the respective screens into a single image is required in Embodiment 1, but the processing can be omitted by using the transmissive window 50 as the component display unit 42.

The transmissive window 50 has properties of a typical display window. For example, when a design of a particular component is to be focused on in simulation, transmissive windows 50 of the other components can be hidden. Reduction or enlargement of the transmissive window 50 and a change of a display location of the transmissive window 50 are easily performed, so that the processing load can easily be adjusted by adjusting a design of the cockpit system.

Embodiment 4

In Embodiment 4, a processing load adjustment device for the cockpit system to which technology of the simulation apparatus 100 described in Embodiments 1 to 3 has been applied is proposed.

FIG. 10 shows an example of a configuration of a processing load adjustment device 110 according to Embodiment 4. The processing load adjustment device 110 is mounted on an actual vehicle 200, and includes a display control signal generation unit 2a, an output generation unit 3a, a processing load calculation unit 5a, and a processing load adjustment unit 6a having functions corresponding to respective functions of the display control signal generation unit 2, the output generation unit 3, the processing load calculation unit 5, and the processing load adjustment unit 6 of the simulation apparatus 100 in Embodiment 1. The display control signal generation unit 2a, the output generation unit 3a, the processing load calculation unit 5a, and the processing load adjustment unit 6a of the processing load adjustment device 110 are also applications performed by single or multiple computers (processors) and created in any programming language. The processing load adjustment device 110 can thus also be implemented with a hardware configuration as shown in FIG. 2.

The processing load adjustment device 110 is connected to a vehicle information acquisition unit 201, a priority storage unit 202, and an output device 203 forming portions of the cockpit system of the actual vehicle 200.

The vehicle information acquisition unit 201 acquires vehicle information of the actual vehicle 200 required to generate an image of each component of the cockpit system from an electronic control unit (ECU), an in-vehicle sensor, and the like of the actual vehicle 200. When time information is not provided to data of the acquired vehicle information, the vehicle information acquisition unit 201 provides the time of acquisition of the data to the data as the time information.

The priority storage unit 202 is a storage medium storing information on a priority of each component displayed by the cockpit system of the actual vehicle 200. For example, a high priority is assigned to a component whose display delay has a large influence on the driving behavior of the driver, such as a meter, and a low priority is assigned to a component whose display delay has a small influence on the driving behavior, such as a screen to select a music to be played back.

The output device 203 is a display device including single or multiple screens to display the image of each component of the cockpit system of the actual vehicle 200.

Although the processing load adjustment device 110 is mounted on the actual vehicle 200 in the present embodiment, the processing load adjustment device 110 may be installed external to the actual vehicle 200, and may be connected to the cockpit system of the actual vehicle 200 via a network, for example.

The display control signal generation unit 2a acquires the vehicle information from the vehicle information acquisition unit 201, and generates a control signal to control display of each component of the cockpit system based on the acquired vehicle information. A parameter to adjust the processing load in response to a request for adjustment from the processing load calculation unit 5a is defined in advance for processing performed by the display control signal generation unit 2a on the vehicle information.

The output generation unit 3a generates the image of each component of the cockpit system based on the control signal generated by the display control signal generation unit 2a. The output generation unit 3a renders the generated image of each component on the screens of the output device 203.

The processing load calculation unit 5a compares the time information of the vehicle information processed by the display control signal generation unit 2a and the time of completion of rendering of the image of the component corresponding to the vehicle information to calculate a time difference between acquisition of the vehicle information and display of the image of the component corresponding to the vehicle information by the output device 203. The time difference corresponds to the processing load of the cockpit system.

The processing load adjustment unit 6a adjusts the processing load of the cockpit system. A method for adjusting the processing load includes a method of changing a parameter used for each operation performed by the display control signal generation unit 2a and the like. Furthermore, when the above-mentioned time difference corresponding to the processing load exceeds an allowable range, the processing load adjustment unit 6a automatically tries to adjust the processing load of the cockpit system not to interfere with the driving behavior of the driver. The processing load adjustment unit 6a thus holds a threshold to determine whether the time difference (processing load) calculated by the processing load calculation unit 5a is within the allowable range, and starts to adjust the processing load of the cockpit system when the time difference exceeds the threshold. In a case where the processing load adjustment device 110 is installed external to the actual vehicle 200, the evaluator external to the actual vehicle 200 may manually adjust the processing load.

FIG. 11 is a flowchart showing operation of the processing load adjustment unit 6a. Operation of the processing load adjustment unit 6a will be described below with reference to FIG. 11.

The processing load adjustment unit 6a executes a flow in FIG. 11 when the time difference (processing load) calculated by the processing load calculation unit 5a exceeds the threshold. Assume herein that the time difference calculated by the processing load calculation unit 5a exceeds the threshold when processing to display a particular component (hereinafter, referred to as a "component X") is performed, for ease of explanation. In this case, the processing load adjustment unit 6a adjusts the processing load so that the processing load of the cockpit system is reduced when the processing to display the component X is performed. In this case, the component X is referred to as a "trigger for processing load adjustment".

Assume that each component holds information (trigger number information) on the number of times that the component becomes the trigger for the processing load adjustment and a flag (processing load adjustment flag) indicating whether the processing load adjustment of the component has already been performed. The processing load adjustment flag is set to "true" when the processing load adjustment of the component has been performed, and is set to "false" when the processing load adjustment of the component has not been performed.

When the time difference (processing load) calculated by the processing load calculation unit 5a exceeds the threshold in a case where the processing to display the component X is performed, the processing load adjustment unit 6a checks the number of times that the component X has become the trigger for the processing load adjustment by reference to the trigger number information of the component X.

When the component X becomes the trigger for the processing load adjustment for the first time (YES in step ST201), the processing load adjustment unit 6a performs iterative processing in steps ST202 to ST204 described below as first processing load adjustment.

In step ST202, the processing load adjustment unit 6a sequentially selects one or more components to each of which a lower priority than that assigned to the component X is assigned. In step ST203, the processing load adjustment unit 6a checks whether the processing load adjustment of each of the selected components has been performed by reference to the processing load adjustment flag of each of the selected components. Processing in step ST204 is performed when the processing load adjustment of each of the selected components has not been performed (NO in step ST203), and the processing load adjustment unit 6a performs the processing load adjustment of each of the selected components in step ST204.

The iterative processing in steps ST202 to ST204 is performed until the processing load adjustment of all the components to each of which a lower priority than that assigned to the component X is assigned is completed.

The processing load adjustment of each component in step ST204 is performed by changing a parameter to adjust the processing load of the component defined in advance by the display control signal generation unit 2a, for example. The parameter is changed not to impair a minimal function of the component. The processing load adjustment unit 6a changes the processing load adjustment flag of the component whose processing load adjustment has been performed in step ST204 to "true".

When the iterative processing in steps ST202 to ST204 ends, the processing load adjustment unit 6a updates (increments) the trigger number information of the component X (step ST205), and ends the flow in FIG. 11.

In a case where the processing to display the component X is performed again later, the processing load adjustment unit 6a starts the flow in FIG. 11 again when the time difference calculated by the processing load calculation unit 5a exceeds the threshold.

The component X becomes the trigger for the processing load adjustment for the second time, so that determination in step ST201 is NO, and determination in step ST206 is YES. In this case, the processing load adjustment unit 6a checks whether the processing load adjustment of the component X has been performed by reference to the processing load adjustment flag of the component X (step ST207). When the processing load adjustment of the component X has not been performed (NO in step ST207), the processing load adjustment unit 6a performs the processing load adjustment of the component X as second processing load adjustment (step ST208). Processing in step ST208 is not performed when the processing load adjustment of the component X has been performed (YES in step ST207).

The processing load adjustment in step ST208 is only required to be performed in the same way as the processing load adjustment in step ST204. The processing load adjustment unit 6a changes the processing load adjustment flag of the component X whose processing load adjustment has been performed in step ST208 to "true".

The processing load adjustment unit 6a updates the trigger number information of the component X (step ST205), and ends the flow in FIG. 11.

In a case where the processing to display the component X is performed again later, the processing load adjustment unit 6a starts the flow in FIG. 11 again when the time difference calculated by the processing load calculation unit 5a exceeds the threshold. The component X becomes the trigger for the processing load adjustment for the third time, so that determination in step ST201 is NO, and determination in step ST206 is NO.

In this case, the processing load adjustment unit 6a determines that a limit of automatic processing load adjustment has been exceeded, and displays an alert on the screen of the output device 203 (step ST209) to alert the driver. The processing load adjustment unit 6a updates the trigger number information of the component X (step ST205), and ends the flow in FIG. 11.

When the component X becomes the trigger for the processing load adjustment for the fourth and subsequent times, and the flow in FIG. 11 is started, determination in step ST201 is NO, determination in step ST206 is NO, and processing in step ST209 is performed.

The parameter held by the display control signal generation unit 2a and the trigger number information and the processing load adjustment flag of each component may each be reset to an initial state when the cockpit system is powered up. An initial value of the trigger number information is zero, and an initial value of the processing load adjustment flag is "false".

According to Embodiment 3, the processing load adjustment device 110 is mounted on the cockpit system of the actual vehicle 200, so that the processing load of the cockpit system can be adjusted to suppress a display delay of the component in an actual driving condition.

Embodiments can freely be combined with each other, and can be modified or omitted as appropriate.

The foregoing description is in all aspects illustrative, and it is understood that numerous unillustrated modifications can be devised.

EXPLANATION OF REFERENCE SIGNS

1 driving environment simulation unit, 2, 2a display control signal generation unit, 3, 3a output generation unit, 4 output device, 5, 5a processing load calculation unit, 6, 6a processing load adjustment unit, 7 input device, 21 data collection unit, 22 data processing unit, 23 data holding unit, 24 processing block, 41 travel image display unit, 42 component display unit, 43 processing load display unit, 50 transmissive window, 100 simulation apparatus, 110 processing load adjustment device, 200 actual vehicle, 201 vehicle information acquisition unit, 202 priority storage unit, 203 output device, 61 processor, 62 memory.

The invention claimed is:

1. A simulation apparatus for a cockpit system of a vehicle, the simulation apparatus comprising:
a processor to execute a program; and
a memory to store the program which, when executed by the processor, results in performance of steps including:
performing simulation of a driving environment of the vehicle involving a driving behavior to acquire driving behavior data as data relating to the driving behavior, and generating a travel image as an image simulating scenery visible from the vehicle during travelling;
generating a first control signal to control display of a component of the cockpit system of the vehicle based on the driving behavior data;
generating an image of the component based on the first control signal;
displaying the travel image;
displaying the image of the component;
determining a processing load of the simulation apparatus from (i) a first time difference between the acquisition of the driving behavior data and the display of the image of the component corresponding to the driving behavior data and/or (ii) a second time difference between the acquisition of the driving behavior data and the display of the travel image generated in response to the driving behavior data;
adjusting the processing load to reduce the first time difference and/or the second time difference in a case where the first time difference and/or the second time difference exceeds a respective predetermined allowable range;
after said adjusting, generating a second control signal, responsive to operation of a driving operation device, to control display of the component of the cockpit system of the vehicle based on driving behavior data corresponding to the driving behavior, the operation of the driving operation device including at least one of operation of a steering wheel, operation of an accelerator pedal, operation of a brake pedal, and/or operation of a gearshift;
generating the image of the component based on the second control signal; and
displaying again the travel image and/or the image of the component based on the adjusted processing load and the operation of the driving operation device resulting in the generation of the second control signal.

2. The simulation apparatus according to claim 1, wherein the processor further
displays the processing load, and
receives instructions to adjust the processing load input by a user.

3. The simulation apparatus according to claim 1, wherein the step of generating the control signal includes a plurality of processing blocks capable of generating the control signal based on the driving behavior data, and the processor changes a processing block used to generate the control signal to adjust the processing load.

4. The simulation apparatus according to claim 1, wherein the step of displaying the image of the component comprises superimposing a transmissive window to display the image of the component.

5. A processing load adjustment device for a cockpit system of an actual vehicle, the processing load adjustment device being mounted in the actual vehicle and comprising:

a processor to execute a program; and memory to store the program which, when executed by the processor, results in performance of steps including:

generating a first control signal to control display of a component of the cockpit system based on vehicle information of the actual vehicle;

generating an image of the component based on the first control signal, and causing the cockpit system to display the image of the component;

calculating a processing load of the cockpit system from a time difference between acquisition of the vehicle information and the display of the image of the component corresponding to the vehicle information;

adjusting the processing load to reduce the time difference in a case where the time difference exceeds a predetermined threshold;

after said adjusting, generating a second control signal, responsive to operation of a driving operation device, to control display of the component of the cockpit system based on vehicle information of the actual vehicle, the operation of the driving operation device including at least one of operation of a steering wheel, operation of an accelerator pedal, operation of a brake pedal, and/or operation of a gearshift;

generating the image of the component based on the second control signal; and causing the cockpit system to display again the image of the component based on the adjusted processing load and the operation of the driving operation device resulting in the generation of the second control signal.

6. The processing load adjustment device according to claim 5, wherein the component of the cockpit system comprises a plurality of components to which respective priorities are assigned, when the processing load exceeds the predetermined threshold in a case where processing to display a particular component is performed, the processor performs first processing load adjustment of adjusting a load on processing of one or more components to each of which a lower priority than that assigned to the particular component is assigned, and when the processing load exceeds the predetermined threshold in a case where the processing to display the particular component is performed even after the first processing load adjustment is performed, the processor performs second processing load adjustment of adjusting a load on processing of the particular component.

7. The processing load adjustment device according to claim 6, wherein when the processing load exceeds the predetermined threshold in a case where the processing to display the particular component is performed even after the second processing load adjustment is performed, the processor issues an alert.

8. The simulation apparatus according to claim 1, wherein the calculating the processing load is based on both of the first time difference between acquisition of the driving behavior data and display of the image of the component corresponding to the driving behavior data and the second time difference between acquisition of the driving behavior data and display of the travel image generated in response to the driving behavior data.

9. The simulation apparatus according to claim 1, wherein the driving behavior data as the data relating to the driving behavior includes line-of-sight information.

* * * * *